Aug. 12, 1958 C. K. BISHOP 2,847,536
ANTICIPATORY HEATER CIRCUIT FOR THERMOSTAT CONTROLS
Filed April 17, 1956 6 Sheets-Sheet 1

INVENTOR
CHESTER K. BISHOP

BY Strauch, Nolan & Neale

ATTORNEYS

Aug. 12, 1958     C. K. BISHOP     2,847,536
ANTICIPATORY HEATER CIRCUIT FOR THERMOSTAT CONTROLS
Filed April 17, 1956     6 Sheets-Sheet 3

INVENTOR
CHESTER K. BISHOP
BY Strauch, Nolan & Neale
ATTORNEY

Aug. 12, 1958     C. K. BISHOP     2,847,536
ANTICIPATORY HEATER CIRCUIT FOR THERMOSTAT CONTROLS
Filed April 17, 1956     6 Sheets-Sheet 5

INVENTOR
CHESTER K. BISHOP
BY Strauch, Nolan & Neale
ATTORNEYS

Aug. 12, 1958     C. K. BISHOP     2,847,536
ANTICIPATORY HEATER CIRCUIT FOR THERMOSTAT CONTROLS
Filed April 17, 1956     6 Sheets-Sheet 6

INVENTOR
CHESTER K. BISHOP

BY *Strauch, Nolan & Neale*

ATTORNEYS

United States Patent Office 2,847,536
Patented Aug. 12, 1958

2,847,536

ANTICIPATORY HEATER CIRCUIT FOR THERMOSTAT CONTROLS

Chester K. Bishop, Columbus, Ohio, assignor, by mesne assignments, to Robertshaw-Fulton Controls Company, Greensburg, Pa., a corporation of Delaware Application April 17, 1956, Serial No. 578,832

18 Claims. (Cl. 200—122)

This invention relates to thermostats having anticipatory heating elements and more particularly to improvements in the anticipatory heater circuit.

Room thermostats as well as other temperature responsive units which are used to control the operation of a heating unit conventionally automatically turn on the heating unit when the temperature is below a desired level and turn off the heating unit when the temperature is above a desired level. The difference in degrees between the "on" point and the "off" point determines the operating differential which is built into the thermostat and is controlled by physical construction.

If the operating differential is small, the thermostat will operate spuriously in response to vibration or small air currents thereby causing an annoying starting and stopping noise from and inefficient operation of the heating equipment, and in some instances causing damage to the heating equipment due to irrational repetitious starting and stopping. If the operating temperature differential is large, the temperature differential in the area to be heated becomes noticeable and, in general, objectionable. This is because there is a quantity of heat stored in the heating unit as a result of its operation which tends to cause the temperature in the heated region to continue to rise even after the heating unit is turned off.

Prior thermostats have been equipped with heat anticipators which are effective to produce a small localized source of heat in the thermostat when the heating unit is on for the purpose of shutting off the heating unit slightly before the desired temperature is reached thereby permitting the latent heat in the heating unit to be dissipated into the room without exceeding the "off" temperature level. The anticipator is deenergized when the heating unit is off so there is no effect on the temperature at which the thermostat is effective to turn the heating unit on. The anticipatory heater thus has the effect of reducing the operating differential of the control unit while still providing a relatively uniform cycle of operation.

In manufacturing control devices incorporating the anticipatory heater, consideration must be given to the fact that different heating systems require different amounts of electric current for operation, and that the desired amount of anticipation varies with the environment of the installation. For these reasons the anticipatory heaters have commonly been made adjustable, as shown for example in U. S. Patent Nos. 2,729,719 to Kronmiller, 2,687,610 to Malone and 2,092,327 to Persons. One of the major difficulties in the prior thermostats is in providing an adjustable heating resistance where the anticipatory heating effect is stable with any value of current that may be present in the thermostat control circuit. If the resistance is large, too much heat is stored in the anticipating heater and the temperature sensitive element of the thermostat is subjected to an artificial temperature due to the latent heat stored in the anticipating heater. Thus in cold weather, when the anticipating heater is frequently energized, the difference between the ambient temperature and the artificial temperature is appreciable and accordingly must be avoided.

It is, therefore, a major object of this invention to provide a novel internal circuit in the thermostat which produces a desired amount of heat anticipation in high or low current systems without adding resistance which has a high degree of heat inertia.

Another object of the invention is to provide a current path through the temperature sensitive element which is in parallel with the current path through the anticipatory heater whereby heat is generated internally of the temperature sensitive element.

In the improved internal circuit which includes a parallel connection providing a current path through the temperature sensitive element, I have found that when the adjustment means for controlling the anticipatory effect is moved in one direction, the anticipation will not always change in the same sense over the entire adjustment range. Thus moving the adjustment means to give a greater anticipation effect in some cases actually provides less anticipatory heat and vice-versa because of the relative changes in the values of current and resistance involved in parallel circuits.

It is accordingly another major object of the present invention to provide in such a thermostat an adjustable heat anticipating circuit wherein the heat anticipation effect will change in the same sense as the direction of displacement of the heat anticipator adjustment means over the entire range of adjustment.

Another object of this invention is to provide in a thermostat having a bimetal element and an anticipating heater, parallel electrical circuits through the bimetal element and one portion of the anticipating heater which are in series with the remainder of the anticipating heater for providing the desired amount of anticipatory heating over a larger range of currents than has heretofore been possible.

A further object of this invention is to provide in a thermostat having an anticipating heater, an auxiliary resistance element in parallel with the heater and in better heat transfer relationship with the temperature sensitive element of the thermostat than the anticipating heater for improving the calibration of the adjustment means controlling the total anticipatory heat effect.

These and other objects of the invention will become more fully apparent from the claims and the description as it proceeds in connection with the drawings wherein:

Figure 1:
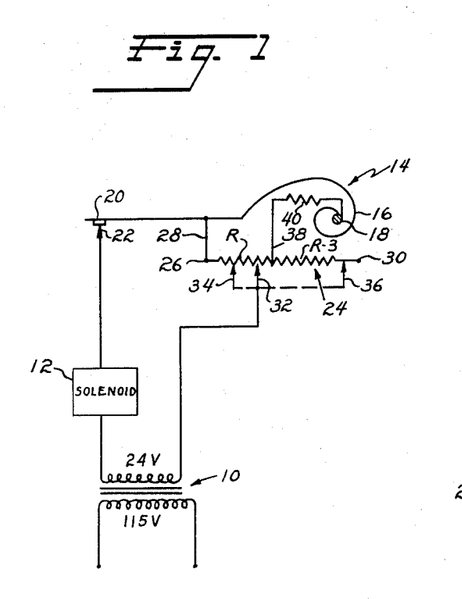
Figure 1 is a circuit diagram illustrating the improved thermostat anticipatory heating circuit of the present invention.

Referring now to the drawings wherein the same reference numerals have been used on like parts throughout the several views, a thermostat control circuit is illustrated in Figure 1 and conventionally includes a step down transformer 10 having a low voltage secondary winding supplying a fixed voltage, as for example 24 volts, to a circuit including solenoid 12 and thermostat 14 for controlling the on and off periods of operation of a furnace or other heating equipment. Thermostat 14 includes a bimetal element 16 mounted on a supporting shaft 18 and carrying at its free end a switch contact 20 movable with expansion and contraction of bimetal 16 and cooperating with fixed contact 22 to close and open the circuit. The bimetal is designed so as to open contacts 20 and 22 upon an increase in temperature, and vice versa.

Incorporated in thermostat 14 in accordance with the present invention is an anticipatory heater resistance winding 24 having a fixed terminal 26 connected electrically to switch contact 20 through a flexible pigtail connection 28, a floating fixed terminal 30 unconnected electrically to any other circuit element and an adjustable tap 32 which is movable between dotted line positions 34 and 36. Fixed terminal 38 is generally centrally located along resistor 24 dividing the resistor into two sections R and R–3 and may be connected directly to the end of the bimetal 16 adjacent support shaft 18. Resistance 40, preferably present in the preferred form of my invention for a purpose explained below, is not essential. There is thus provided a first current path from contact 20 through lead 28, terminal 26 through resistance R to adjustable tap 32 and a second parallel circuit from contact 20 through bimetal spiral 16, resistance 40 if used, and fixed terminal 38 to adjustable tap 32.

The internal impedance of different models of solenoid 12 conventionally used with furnaces may vary with each particular brand or type of solenoid so that the current through the thermostat may be slightly over one ampere or as little as 0.3 or 0.4 ampere. It is difficult to obtain the preferred amount of heat from prior heat anticipators with all current values that are commercially used, and in accordance with one important feature of the present invention, a current path is provided through thermostat 14 which includes bimetal element 16 so that its internal resistance, while only a fractional part of an ohm, will be effective to internally generate some heat and thereby produce a heating effect in addition to that provided by anticipatory heater resistance 24.

Maximum heat anticipation is obtained for a given current when adjustable tap or slider 32 is set at its extreme position shown in dotted lines 36 and contacting resistance 24 adjacent terminal 30, the magnitude of the current, of course, being determined primarily by the impedance of the solenoid 12. Under this condition all the current in the thermostat circuit flows from adjustable tap 32 in resistor section R–3. At terminal 38 the current divides into two parallel circuits, one through bimetal 16 and resistance 40, if used, and the other through resistor R and pigtail 28. The division of current is in inverse ratio to the resistance in the parallel circuits. As slider 32 is moved from terminal 30 to terminal 38, the heat provided by the anticipation circuit elements will decrease in a specific installation where the same solenoid 12 is in use. This is because the total amount of anticipatory heater resistance is decreased while the total circuit current remains substantially constant. To maintain the same heating effect with slider 32 at terminal 38 as is provided when the slider is at terminal 30, a solenoid having a higher current rating is required.

With slider 32 at terminal 38 and a given current flowing through the thermostat circuit, the anticipatory heat effect on bimetal 16 should decrease as the slider is moved from terminal 38 toward terminal 26. Considered from the standpoint of using a solenoid having a larger current rating, it should be possible to obtain a standard or reference value of anticipatory heat effect by moving slider 32 to some position between terminals 38 and 26, and in all cases increase the amount of anticipatory heat by moving slider 32 toward terminal 30 and decrease the amount of anticipatory heat by moving slider 32 toward terminal 26.

If resistance 40 is not used or certain design limitations, as discussed below, are not observed, with slider 32 at terminal 38 and a given current flowing in the thermostat circuit, the anticipation effect will increase as slider 32 is moved away from terminal 38 towards terminal 26, reaching a maximum, and then decrease as the slider continues toward terminal 26 rather than continuously decreasing as is desired. This characteristic is undesirable because it prevents proper calibration of the positional displacement of slider 32 in terms of current for a given anticipation effect, for as slider 32 is moved in either direction away from terminal 38 an increase of anticipation will result.

Figure 2:
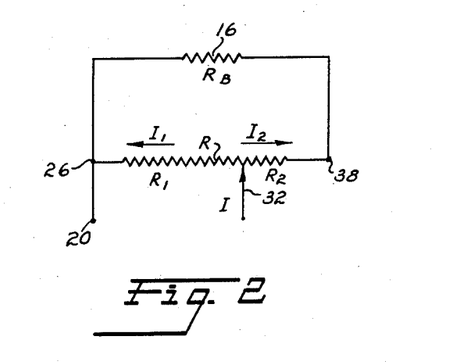
Figure 2 is a circuit diagram of part of the circuit of Figure 1.

To show the conditions necessary to obtain a decrease in anticipation as slider 32 is moved from terminal 38 toward terminal 26 and thereby prevent the undesirable characteristics mentioned above, the following discussion will omit consideration of resistance 40, the resistance of bimetal 16 will be designated $R_B$ and only the remainder of the thermostat circuit, as shown in Figure 2, will be considered. The desired effect, with reference to Figure 2, is that as slider 32 is moved from terminal 38 toward terminal 26 a decrease in the effect of heat provided by the anticipator circuit elements on bimetal element 16 should be obtained.

In any thermostat having heat anticipator elements, it is apparent that the heating effect on the temperature sensitive element in degrees provided by each member of the heat anticipating elements may be found by multiplying the heat generated in each element (which is equal to the square of the current through the element times the resistance) by a heat transfer constant or coefficient between the particular element and the temperature sensitive bimetal element. This heat transfer constant will be designated by the terms $K_R$ and $K_{R-B}$ for resistance R and the resistance of bimetal 16 respectively. The heat transfer constant K of the different heat contributing elements may be found by separately determining the effect on the deflection of bimetal element 16 of each of the heat contributing elements when carrying a known amount of current since the internal resistance of each element is readily measurable.

The sum of the effects of each heat contributing element is the total anticipation A. With slider 32 at terminal 38, the anticipation is due to the combined effect of the current flowing through the bimetal 16 and the current flowing through resistor R, while with slider 32 moved away from terminal 38 toward terminal 26, the anticipation is due to the current flowing in the following elements: resistance $R_2$, bimetal 16, and the resistance $R_1$. Thus referring to Figure 2 the total anticipation A may be expressed mathematically as follows:

$$A = I_2^2 R_2 K_R + I_2^2 R_B K_{R-B} + I_1^2 R_1 K_R \qquad (1)$$

where $R_B$ = resistance of bimetal element 16
$R_1 + R_2 = R$ = resistance of anticipatory resistance between terminals 38 and 26
$K_{R-B}$ = heat transfer constant of bimetal
$K_R$ = heat transfer constant of anticipatory resistance R
$I_1 + I_2 = I$ = total current through the control Letting $$\frac{R_2}{R}=X,\ \frac{K_R}{K_{R-B}}=Z\ \text{and}\ \frac{R}{R_B}=Y$$

and since $$I_1=\frac{R_2+R_B}{R+R_B}I=\frac{XY+1}{Y+1}I \quad (2)$$

and $$I_2=\frac{R_1}{R+R_B}=\frac{(1-X)Y}{Y+1}I \quad (3)$$

then $$A=\frac{K_{BR}R_BI^2}{(1+Y)^2}[(1-X)^2Y^2+ZY^3X(1-X)^2+ZY(1-X)(1+XY)^2] \quad (4)$$

Equation 4 gives the total anticipation in terms of the ratios X, Y and Z, the ratio X determining the setting of slider 32 along resistor R. In general, the curve for the heat anticipation effect A as a function of the position of slider 32 on resistor R, will have a form of the general type shown in Figure 3. This can be explained as follows with reference to the circuit of Figure 2. Assuming a constant current, as slider 32 is moved from terminal 38 where $X=0$ toward terminal 26 where $X=1$, the current through the circuit from slider 32 to fixed terminal 38 through bimetal 16 will decrease while the current through the circuit from slider 32 to fixed terminal 26 increases. This is due to the change in ratios of resistance of the parallel circuits.

It is desired that under this condition in reference to the situation with slider 32 at terminal 38, the decrease in the heat anticipation effect on bimetal 16 due to the reduced current through bimetal internal resistance $R_B$ and resistor $R_2$ should be greater than the increase in the heat anticipation effect on bimetal 16 resulting from the increased current in resistor $R_1$.

Figure 3:
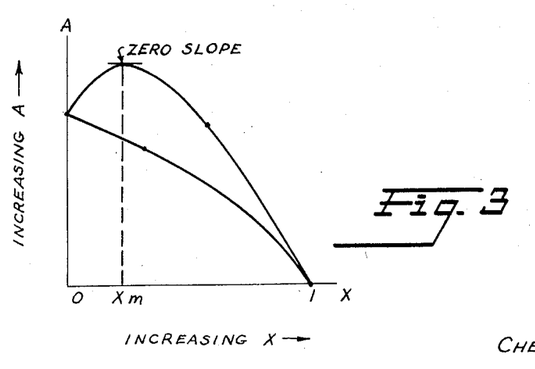
Figure 3 is a graph useful in understanding certain of the underlying principles of the present invention.

The problem is to determine the condition for which the curve of Figure 3 does not have a maximum (or point of zero slope) for positive values of X between 0 and 1. The first derivative of Equation 4 as determined by conventional Calculus techniques and given by Equation 5 enables the value of X for which A has a maximum to be determined.

$$\frac{dA}{dX}=0=(2Y^2-2ZY^3-4ZY^2)X+(ZY^3+2ZY^2-ZY-2Y^2) \quad (5)$$

Solving Equation 5 for $X_m$ which gives a maximum value for A $$X_m=\frac{Z-ZY^2-2ZY+2Y}{Y(2-2ZY-4Z)}=\frac{Z(1-Y^2-2Y)+2Y}{2Y[1-Z(Y+2)]} \quad (6)$$

Equation 6 gives the value of $X_m$ at which the maximum of A is found. When $X_m<0$ or $>1$ there is no maximum of A in the range of physical interest for X. Therefore the case $X_m$ equals 0 determines a relationship between Z and Y which is the dividing line between the cases where a maximum occurs for positive or for negative values of $X_m$. Thus, for the numerator of Equation 6 $=0$, where $X_m=0$ gives $$Z=\frac{2Y}{Y^2+2Y-1}$$

or $$\frac{K_R}{K_{R-B}}=\frac{2\frac{R}{R_B}}{\left(\frac{R}{R_B}\right)^2+2\frac{R}{R_B}-1} \quad (7)$$

Figure 4:
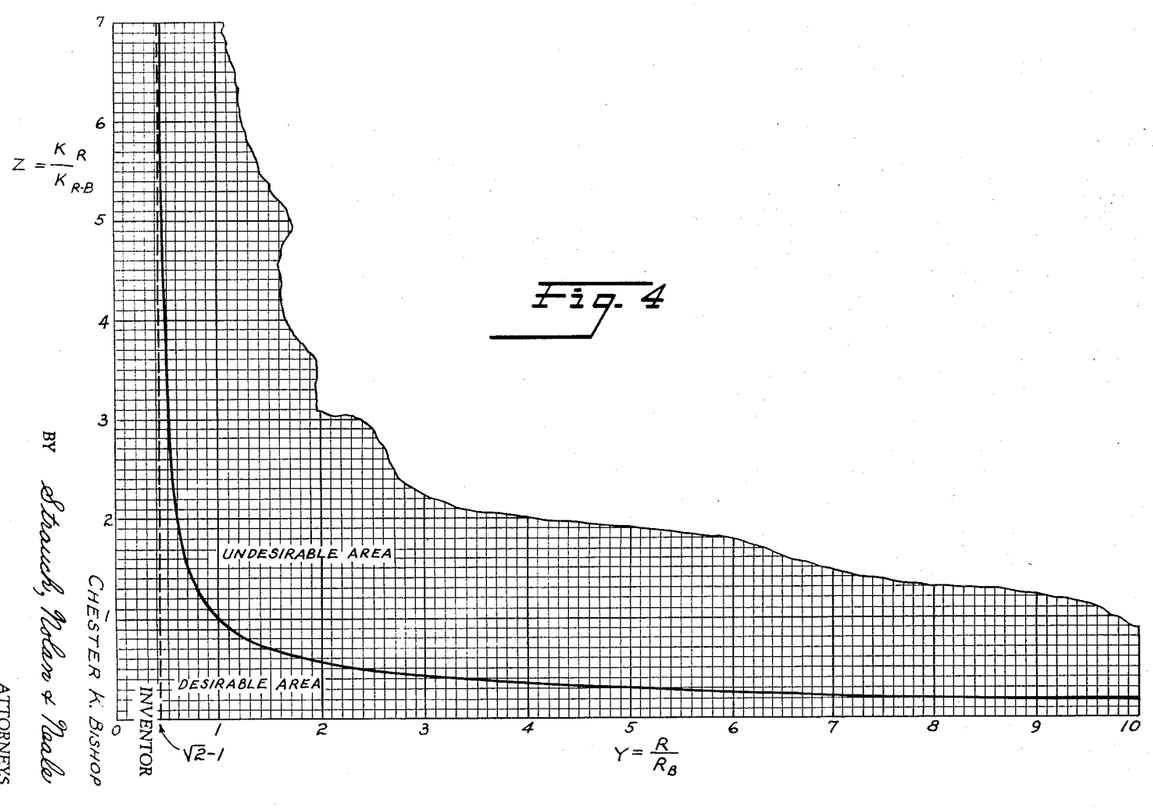
Figure 4 is a graph showing the desired relationship between the values of resistance to be used and the heat transfer coefficients as determined in accordance with the present invention.

The solution of Equation 7 is of interest only for positive values of Z and Y. Figure 4 shows the limiting relation between Z and Y expressed by Equation 7. For a given value of Y greater than $\sqrt{2-1}$, it can be shown that when Z lies below the curve, $X_m$ from Equation 6 is negative, or greater than 1.0 when $$Z<\frac{1}{Y+2} \quad (8)$$

When Z lies above the curve, $X_m$ is positive and in the undesired range between zero and 1.0. Therefore, pairs of values of Z and Y which lie below the curve of Figure 4 correspond to the desired case of no maximum or point of zero slope in the curve of Figure 3 for positive values of X.

It is thus established that physically obtainable ratios equal to or smaller than the ones satisfying Equation 7 will provide the desired decrease of anticipation as slider 32 is moved from terminal 38 toward terminal 26. The curve of Figure 4 shows a plot of the critical values in graph form and ratios of the ordinate and abscissa whose lines intersect below the curve give the desired operation.

It is evident from a study of the curve of Figure 4, that in order to avoid the effects of variability in Z and Y due to manufacturing tolerances and other variations, Y or the ratio or R to $R_B$ should be at least 0.6 and preferably 1.0 or higher and Z less than the value found in the curve of Figure 4 for a given value of Y.

In designing anticipation thermostats utilizing the circuit diagram of Figure 1 and more specifically that part of the circuit shown in Figure 2, it is found that when the desired value of resistance R is used, the ratio of R to $R_B$ is too large to meet the requirements given in the equation mentioned above. This is due to the fact that the resistance of the bimetal is usually very low. This condition is corrected by adding a resistor 40 (see Figure 1) of the proper resistance value which is clamped or cemented to the surface of bimetal 16 in such manner as to have a high heat transfer constant K.

Resistance 40 may be substituted for the circuit connection through bimetal element 16 in which case a flexible pigtail lead is used to connect the end of resistance 40 to switch contact 20 thereby by-passing the bimetal element. The preferred form of my invention however, has resistor 40 in series circuit relation with bimetal element 16 as illustrated in Figure 1. Resistor 40 is physically secured to a surface on bimetal 16 and the heat transfer constant $K_{B-R}$ is determined by the combined heating effect of current through resistor 40 and bimetal 16.

As an illustrative example of the present preferred embodiment, the following values of resistance were used:

R was 0.5 ohm and R–3 was 0.46 ohm, resistor 40 was 0.42 ohm and the bimetal internal resistance was 0.08 ohm. For calculation purposes, $R_B$ was 0.42 ohm plus 0.08 ohm or 0.5 ohm and $K_{R-B}$ was the equivalent anticipation factor of the bimetal and resistor 40 in combination. In the physical embodiment to be described below $K_{R-B}$ was determined to be 131 while $K_R$ was determined to be 60.

These ratios fall well within the desired area as illustrated in the curve of Figure 4, and are in the region under the curve where there is a relatively large desired area so that even with minor variations in values of resistances and heat transfer constants which occur in mass production manufacturing, the thermostat will reliably provide the desired operation.

While the section R–3 of resistance 24 between terminals 30 and 38 has no effect on the factors determining the curve of Figure 4, it is desirable to include this section as part of the anticipatory heater circuit since this resistance increases the maximum amount of anticipatory effect that can be obtained. If only extremely small amounts of heat anticipation were desired, anticipator resistor 24 could be remotely located with respect to the temperature sensitive element of the thermostat and $K_R$ would accordingly be very small. Thus the ratio of $K_R$ to $K_{R-B}$ would in most cases lie under the curve of Figure 4. However, in that event, the amount of anticipation effect added by R-3 when slider 32 is moved into the region between terminals 38 and 30 would be very small and completely unsatisfactory from a practical standpoint of giving a controlled variable heat anticipation effect.

Figure 5:
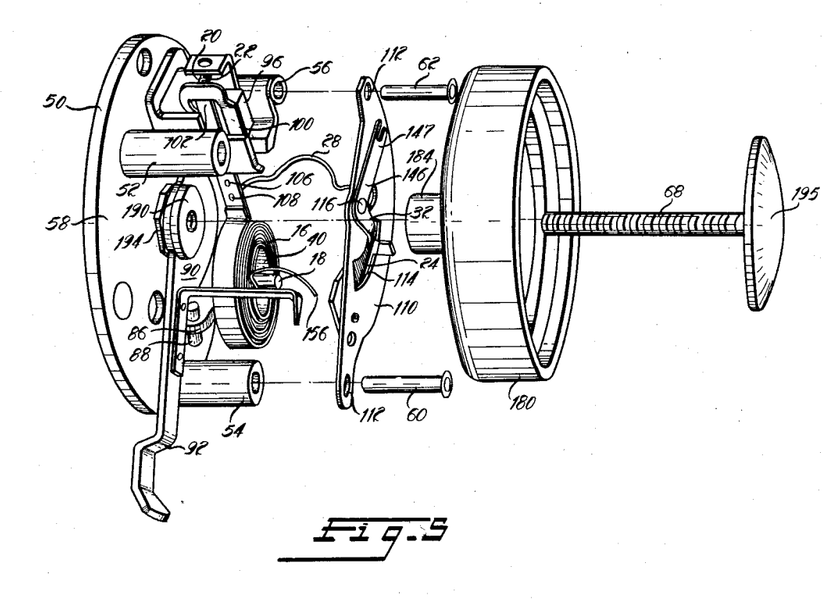
Figure 5 is an exploded pictorial view of a thermostat control incorporating the circuit of the present invention.
Figure 6:
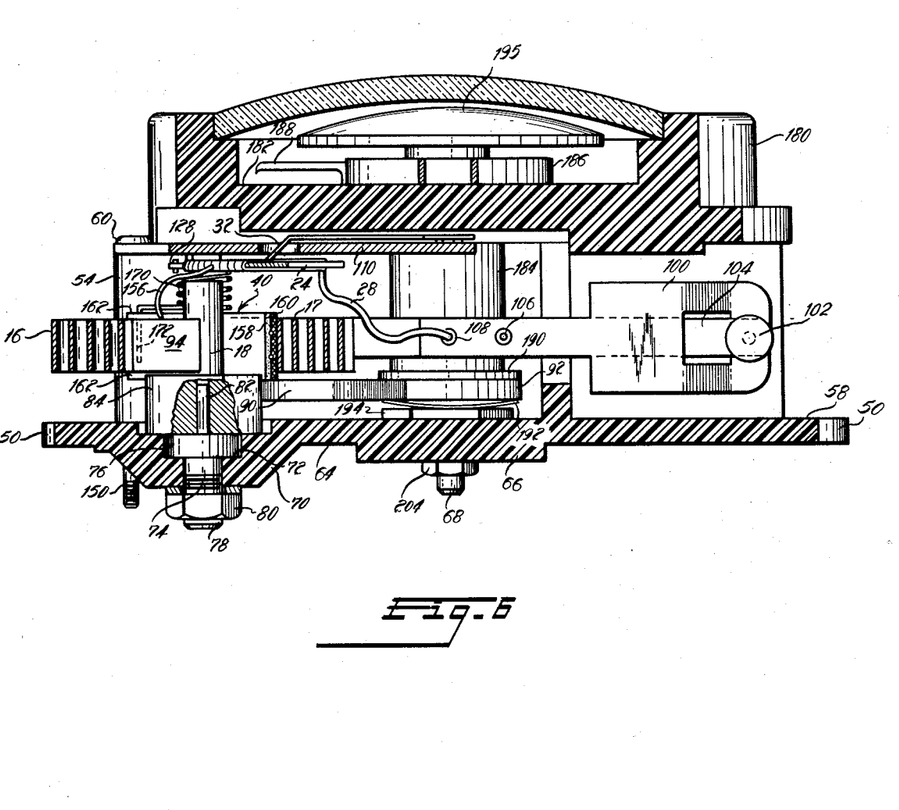
Figure 6 is an elevation view in section of the control of Figure 5.

Referring now to Figures 5 through 12 there is illustrated one form of the thermostat embodying the improved anticipatory heater circuit of my present invention as described above. As best shown in Figures 5 and 6 the thermostat has a circular generally flat support plate 50 of a non-conducting moldable plastic material and is formed with two posts 52 and 54 and switch contact closure portion 56 which are integral with and extend perpendicularly from outer surface 58 of plate 50. Support plate 50 is adapted to be mounted vertically in a suitable base, not shown, which is mounted on a wall of a room where the temperature is to be controlled. Post 54 and portion 56 are each formed with a through bore for receiving tubular rivets 60 and 62 which when assembled extend through and clampingly engage lower surface 64 of support plate 50.

Referring now to Figure 6, lower surface 64 of plate 50 has a centrally located boss 66 which is apertured for receiving the threaded end of screw 68. A second boss 70 is located near the edge of support plate 50 for receiving a cantilever bearing which supports shaft 18 and outer surface 58 of plate 50 opposite boss 70 is preferably recessed or faced to provide a suitable bearing surface 72. In the illustrated embodiment a cantilever bearing is provided for supporting shaft 18 comprising member 74 having an enlarged annular shoulder 76 cooperating with bearing surface 72 and a threaded end 78 held in position as by a lock washer and nut 80. The cantilever bearing member contains a circular shaft 82 of reduced diameter extending upwardly from shoulder 76 which fits freely into a central bore in shaft 18. Shaft 18 is thus supported solely by the cantilever bearing and mounted for pivotal movement.

Hub 84, which may be made integral with shaft 18 or otherwise secured rigidly thereto, is formed with an arm 86, see Figure 5, which carries at its outer end an adjustable screw member 88, one end of which acts as a follower on cam 90 carried by thermostat control arm 92 which in turn is mounted for pivotal movement about screw 68. Helical spring 170 is provided to bias member 88 against cam 90.

Temperature sensitive element 16 is a bimetallic spiral shaped member having end 94 extending radially inwardly of the spiral and secured to shaft 18. The free end of bimetallic spiral 16 carries switch contact 20 which is adapted to engage against adjustable screw 22 forming the fixed terminal of the switch contact. Adjacent the fixed terminal 22 is a permanent magnet 96 for providing a snap action between contacts 20 and 22 and appreciable operating temperature differential.

Movable contact 20 comprises a backing plate 100 of magnetic material carrying a contact member 102 on a flexible metal strip 104 secured to plate 100 as by rivets 106 and 108. Plate 100 is secured to the free end of bimetal spiral 16 adjacent rivet 108 as by a spot weld. Movement of control arm 92 and cam 90 controls the position of shaft 18 through cam follower member 88, and arm 86 to thus control the temperature at which contacts 20 and 22 open and close.

Figure 7:
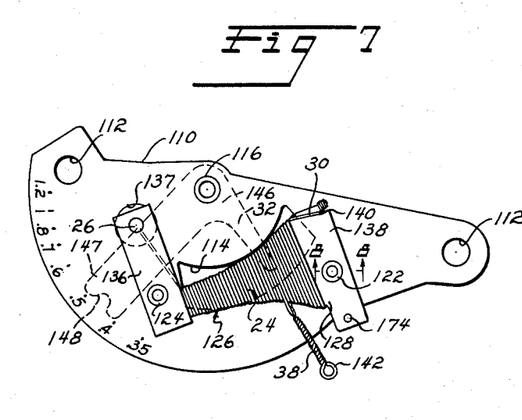
Figure 7 is a view showing the details of construction of the anticipatory heater of the present invention.
Figure 8:
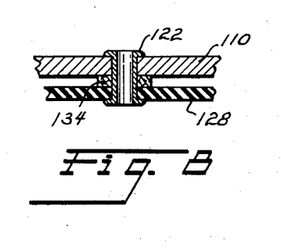
Figure 8 is a view in section taken along line 8—8 of Figure 7.

Mounted on the outer ends of post 54 and switch contact closure portion 56 is a flat plate 110, most clearly shown in Figure 7. Plate 110 has apertures 112 at opposite ends for receiving rivets 60 and 62 (Figure 5) with rivet 60 on post 54 making good electrical connection to plate 110. Plate 110 is formed with slot 114 which is arcuately disposed about the axis of rivet 116. Suitable apertures are provided in plate 110 for receiving rivets 122 and 124 which support anticipatory heater assembly 126. Heater assembly 126 comprises a shaped sheet of insulating material 128, resistance wire 24 and an electrical terminal post 26. As best shown in Figure 8, the sheet of insulating material 128 is mounted parallel to and spaced from the adjacent surface of plate 110 by a distance of approximately one-sixteenth inch by means of spacer washer 134 of insulation material around rivet 122. A similar mounting washer is used at rivet 124. The sheet of insulating material 128 contains an elongated end section 138 which is slotted at 140 and the end sections are connected by a central tapered portion which carries the resistance wire winding 24. An aperture 137 is provided in plate 110 adjacent terminal 26 thereby enabling pigtail connection 28 from rivet 108 on the free end of bimetal element 16 to be soldered in position on terminal 26 after final assembly of the control element.

Resistance wire 24 in the illustrated embodiment is .0113 inch enameled wire and extends from terminal post 25, between end section 136 and plate 110 to the narrowest portion of the tapered section and then is wound, in a single layer to the widest portion of the tapered section. The free end 30 of resistance wire 24 is terminated without electrical connection to any other circuit element and in the illustrated embodiment is inserted in slot 140 and secured around the insulating material of sheet 128.

A fixed tap 38 rigidly secured and electrically connected to the winding of resistance wire 24 at a position intermediate the ends of the tapered section at a position approximately one-third of the distance along the tapered section from the widest portion toward the narrowest portion. The total resistance to each end of the resistance wire 24 on the tapered section from fixed tap 38 is as stated above, between 0.4 and 0.5 ohm and approximately equal since the length of wire and hence the resistance of each turn at the larger portion of the tapered section is greater than the length of the wire and resistance of each turn at the smaller section.

Figure 9:
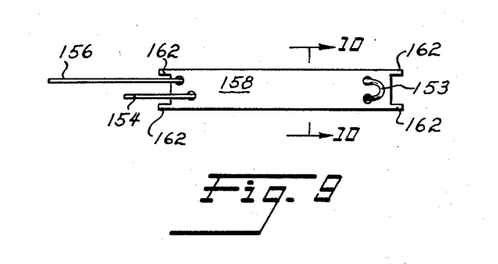
Figure 9 is a view of the heater in series with the bimetal element.

Fixed tap 38 is preferably formed by a loop of the wire forming resistance 24 which is twisted as shown in Figure 7 to make the extension stiffer and to form loop 142 for receiving end 156 of resistor 40 shown in Figure 9. A sleeve of insulation material, not shown, is placed on fixed tap 38 and extends between loop 142 and the tapered winding to assure there is no electrical contact between terminal 38 and metal plate 110.

On the side of plate 110 opposite anticipatory heater assembly 126, adjustment member 146 is mounted for pivotal movement about rivet 116. Adjustment member 146 is formed with a first arm 32 bent to extend through slot 114 to contact and slide along resistance wire 24 and with a second arm 147 extending toward the outer edge of plate 110. An index 148 is provided at the extremity of arm 147 for cooperation with suitable indicia on plate 110. In the illustrated embodiment the indicia (through actually positioned on the invisible side of plate 110 as shown in Figure 7) are calibrated approximately in terms of amperes flowing through the thermostat to provide the same amount of anticipatory heating effect for each current value. Slider or adjustable tap 32 is electrically connected through rivet 116 to plate 110 which in turn is electrically connected to rivet 60 through post 54 to terminal 150 shown in Figure 6 as extending below support plate 50.

Resistance winding 24 between free end 30 and fixed terminal 38 is tapered to cause the anticipatory heater resistance to decrease approximately exponentially relative to the displacement of slider 32. Thus when slider 32 is moved toward fixed terminal 38, the overall resistance in the thermostat circuit is reduced thereby causing a slight increase of current flow. Since the heat generated is proportional to the product of the square of the current and the resistance, forming heater 24 so that its resistance changes non-linearly (and preferably substantially exponentially) according to displacement of slider 32 has a linearizing effect on the calibration of the indicia of the scale on plate 110.

The taper on resistance winding 24 between fixed terminal 38 and terminal 26 has the effect of desirably compressing the scale at the region where slider 32 passes terminal 38 in going toward terminal 26, as shown in Figure 7. This is because resistance values of R and $R_B$ of Figure 2 are approximately equal and a slight displacement of slider 32 toward terminal 26 does not change the relative amounts of current I and $I_2$ at this position as much as would a similar displacement of slider 32 at a position closer to terminal 26.

From Figure 6 it can be seen that the anticipatory heater resistance 24 is supported above temperature sensitive element 16 so that the heat generated in resistance winding 24 radiates toward spiral bimetal element 16 and has a heat transfer constant of coefficient $K_R$ which depends in a large part on the distance between the anticipatory heater 24 and the outer edge 17 of bimetal element 16. A heating effect on the bimetal element provided when current is supplied to winding 24 is thus due solely to radiation. There is no mechanical or electrical connection between the upper end of shaft 18 and plate 110 as each part is at a different electrical potential.

One electrical circuit through the thermostat from movable contact 20 is from rivet 108 through pigtail 28 to terminal 26 of anticipatory heater winding 24 and to slider 32 which is connected to plate 110. A parallel circuit connection is provided from terminal 20 through bimetallic spiral 16 to end 94 which is connected to shaft 18 and from lead 156 to loop 142 of terminal 38 shown in Figure 7.

Figure 10:
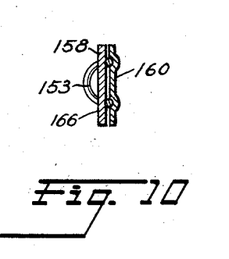
Figure 10 is a view in section of the heater as seen along line 10—10 of Figure 9.

Resistance 40, which is used in the present invention to provide the desired operation as explained in connection with Figure 4, is physically secured to the inside coil of bimetal spiral winding 16 as illustrated in Figure 6 and thereby has a larger heat transfer coefficient $K_{R-B}$ than the heat transfer coefficient of heater winding 24. In Figures 9 and 10 resistance 40 is shown as it may be physically constructed and as here shown comprises a single loop of resistance wire 153 having a short end 154 and a longer end 156 extending from between two sheets of insulating paper 158 and 160. Sheet 158 is of relatively stiff paper and formed with ears 162 for fitting on opposite sides of the bimetal element 16 while sheet 160 is a more flexible material such as a transparent or masking tape with its adhesive side facing sheet 158. Suitable holes are provided in sheet 158 for spacing the two sides of the wire loop. A suitable adhesive is applied to surface 166 and the second resistance element is positioned on the inside of the inner spiral of bimetal element 16 as illustrated in Figure 6. Terminal 154 is connected as by solder to bimetal section 94 while terminal 156 is connected to loop 142 at terminal 38 best shown in Figure 7.

For assembly, bimetal spiral 16 and hub 84 are secured to shaft 18 and the shaft then positioned on cantilever bearing member 74. Helical spring 170 is placed on the upper end of shaft 18 and has a lower free end 172, as shown in Figure 6, abutting section 94 of bimetallic spiral 16 and an upper end adapted to fit in aperture 174 on insulating card 128 shown in Figure 7. All of the parts shown in Figure 7 are preferably preassembled to form a subassembly which is mounted on post 54 and switch enclosure portion 56 of support plate 50 thereby providing a subassembly that includes all of the electrical circuit components which are used in accordance with the present invention.

Dial plate housing 180, best shown in Figures 5, 6, 11 and 12 is generally cylindrical and contains a large central recess in its outer surface for carrying a circular scale plate 182. Hub 184 is provided as part of housing 180 and carries a bimetal spiral thermometer 186 for cooperating with a first set of indicia on one side of scale plate 182 to indicate ambient temperature in the region of the thermostat. Screw 68 fits loosely through hub 184 and receives on its lower end washer 190, thermostat control arm 92, a spring washer 192 and nut 194. Nut 194 is threaded on the end of screw 68 and is formed with a cylindrical portion 196 which extends through washers 190 and 192 and control arm 92 whereby control arm 92 is mounted for pivotal movement about the axis of screw 68 and disc 195 is secured against the outer end of hub 184 thereby covering bimetal spiral 186.

Figure 11:
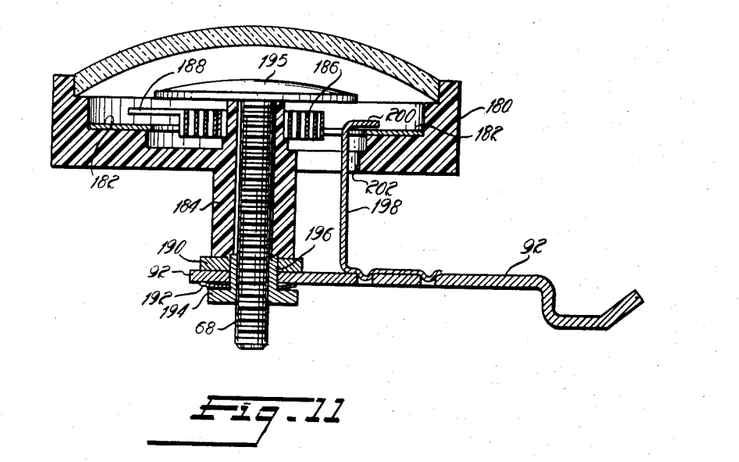
Figure 11 is an elevation view in section of the scale plate housing.
Figure 12:
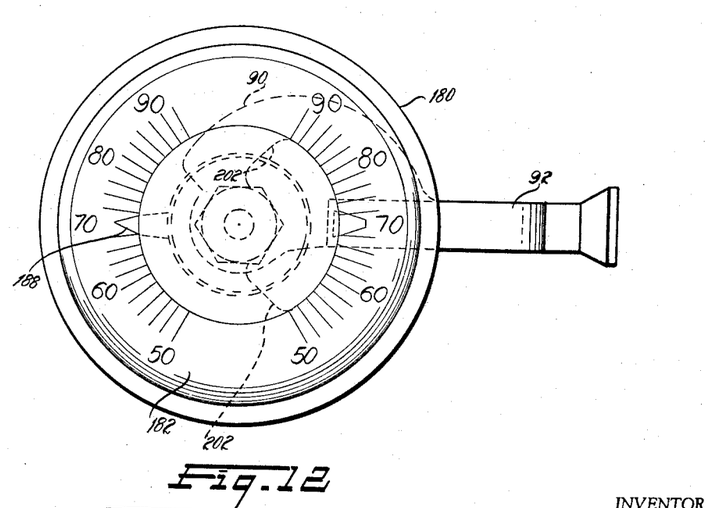
Figure 12 is a front view of the scale plate housing.

Suitably secured to control arm 92 is an index arm 198 carrying pointer 200 which cooperates with a second set of indicia on the side of scale plate 182 opposite from the first indicia used with thermometer pointer 188. Index arm 198 extends into housing 180 through an arcuately shaped opening 202 shown in dotted lines in Figure 12. The outline contour of cam 90 which is formed integral with control arm 92 is also shown in dotted lines in Figure 12. The subassembly shown in Figures 11 and 12 is placed into position on supporting plate 50 and secured in position as with nut 204 as best shown in Figure 6.

There has thus been described a thermostat which incorporates the variable heat anticipatory control circuit of the present invention. It should be understood that the heat anticipatory control circuit may easily be incorporated in other types of thermostat structures, and that variations of the circuit may be used without departing from the principles of this invention. In installations where adjustability of the amount of anticipatory control is not desired, the novel mounting arrangement of resistance 40 inside the bimetal may be used alone and without the variable anticipatory heater resistance 24.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A control device comprising: a bimetal control element having switching means attached to one end thereof and being supported at the other end, an electric heater winding associated with said bimetal element for heating said bimetal element, a first electric circuit connection from said switching means to an end of said bimetal element and from the other end of said bimetal element to an intermediate portion of said heater winding, a second electric circuit connection from said switching means to a fixed terminal on said heater winding, and a movable tap on said heater winding, said tap being movable between a position adjacent said fixed terminal and a position beyond said intermediate portion toward the other end of said heater winding for providing a controlled anticipatory heating effect on said control device with different magnitudes of current passing through said switching means.

2. The control device as defined in claim 1 wherein said other end of said heater winding is electrically insulated from circuit connections other than said movable tap.

3. The control device as defined in claim 1 wherein the change of resistance provided by said electric heater winding varies non-linearly with the displacement of said movable tap.

4. In a control device: a bimetal control element having switching means attached to one end thereof and being supported at the other end; an electrical heater winding associated with said bimetal element for heating said bimetal element; a first electric circuit connection from said switching means to said one end of said bimetal element and from said other end of said bimetal element to a fixed tap on a central portion of said heater winding; a second electric circuit connection from said switching means to a fixed tap at one end of said heater winding; a movable tap on said heater winding having an index positioned according to the position of said tap; and a scale plate with indicia cooperating with said index; said tap being movable between a position adjacent the fixed tap at said end of the heater winding and a position beyond said fixed tap at the central portion of the heater winding to provide an increase in the anticipatory heating effect.

5. The control device as defined in claim 4 wherein the resistance of said heater winding between the fixed tap at the end of the winding and said movable tap varies non-linearly with the displacement of the movable tap along said heater.

6. The control device as defined in claim 4 further having a resistance element electrically connected in series with the current path through said bimetal element and physically supported by said bimetal element in good heat transfer relationship therewith.

7. In a control device: a bimetal element having switching means controlled thereby; an anticipatory heater positioned adjacent said temperature sensitive element and effective when energized for heating said element; a pair of fixed terminals and a movable tap on said heater; means connecting said switching means to one of said fixed terminals to provide a first electrical circuit from said switching means to said movable tap; a second electrical circuit in parallel with said first electrical circuit comprising means connecting said switching means through said bimetal element to the other of said fixed terminals, the resistance of each of said circuits being substantially equal when said movable tap is positioned at said other of said fixed terminals.

8. In a control device: a temperature sensitive element having switching means controlled thereby; an anticipatory heater positioned adjacent said temperature sensitive element and effective when energized for heating said element; a pair of fixed terminals and a movable tap on said heater; means connecting said switching means to one of said fixed terminals to provide a first electrical circuit from said switching means to said movable tap, a second electrical circuit from said switching means to said movable tap including a resistance element in closer proximity to said temperature sensitive element than said anticipatory heater and means connecting said switching means through said resistance element to the other of said fixed terminals.

9. The control device as defined in claim 8 wherein said temperature responsive element is a bimetal strip and said resistance element is insulated from and in physical contact with a surface of said bimetal strip.

10. The control device as defined in claim 9 wherein said second electrical circuit includes a current path through said bimetal strip in series with said resistance element.

11. The control device as defined in claim 8 wherein the decrease in the heat anticipation effect due to current through said second electrical circuit and that part of the anticipatory heater between the movable tap and said other of said fixed terminals is greater than the increase in the heat anticipation effect resulting from the current flow between said movable tap and said one fixed terminal as said movable contact is moved from any one position to a position nearer said one fixed terminal.

12. In a control device: a temperature sensing element having switching means controlled thereby; an anticipatory heater positioned adjacent said temperature sensitive element and having a first heat transfer constant relative thereto; a pair of fixed terminals and a tap on said heater movable between said pair of fixed terminals; means connecting said switching means to one of said fixed terminals to provide a first electrical circuit from said switching means to said movable tap; and a second electrical circuit from said switching means to the other of said pair of fixed terminals including a resistance element adjacent said temperature sensitive element and having a second heat transfer constant relative thereto, the ratio of the first heat transfer constant to the second heat transfer constant being no greater than $$\frac{2\frac{R}{R_B}}{\left(\frac{R}{R_B}\right)^2 + 2\frac{R}{R_B} - 1}$$

where R is the resistance in ohms of said anticipatory heater and $R_B$ is the resistance in ohms of said second electrical circuit.

13. The control device as defined in claim 12 wherein said temperature responsive element is a bimetallic spiral strip and said second electrical circuit includes a current path through the bimetallic strip in series with said resistance element.

14. The control device as defined in claim 12 wherein the ratio of R to $R_B$ is greater than 0.6.

15. In a control device having a temperature sensitive element controlling switch contacts which open by a rising temperature, a first local heater positioned adjacent said temperature sensitive element to have a first heat transfer coefficient comprising a first electrical resistor having one end terminal connected to the one of said switch contacts whereby the current path to said resistor is open when the switch contacts are open, a second local heater positioned adjacent said temperature sensitive element to have a second heat transfer coefficient including a second electrical resistor having one terminal connected to said one of said switch contacts and another terminal connected to a fixed terminal intermediate of the ends of said first electrical resistor, an adjustable tap on said first resistor movable from said fixed terminal toward either of the end terminals thereof, the ratio of said first heat transfer coefficient to the second heat transfer coefficient being no greater than $$\frac{2\frac{R}{R_B}}{\left(\frac{R}{R_B}\right)^2 + 2\frac{R}{R_B} - 1}$$

where R is the value of the resistance of said first electrical resistance between said fixed terminal and said one end terminal and $R_B$ is the resistance of said second local heater.

16. The control as defined in claim 15 wherein the ratio of R to $R_B$ is greater than 0.414.

17. A thermostat control having a bimetal spiral element supported at one end and carrying switch contact means at its free end, an anticipatory heater positioned adjacent to but spaced from said bimetal element and having a pair of fixed terminals and a slider movable between said fixed terminals, a length of resistance wire connected to said one end of the bimetal and to one of said fixed terminals on said heater, said resistance wire being supported between two flexible sheets of insulating material with one of said sheets of insulating material secured to said bimetal spiral element along a substantial length of a curved section thereof and a flexible circuit connection from the free end of said bimetal element to the other of said pair of fixed terminal connections on said anticipatory heater.

18. In a control device: a bimetal control element having switching means attached to one end thereof and being supported at the other end; an electrical heater winding associated with said bimetal element for heating said bimetal element; a first electric circuit connection from said switching means to said one end of said bimetal element and from said other end of said bimetal element to a fixed tap on a central portion of said heater winding; a second electric circuit connection from said switching means to a fixed tap at one end of said heater winding; a movable tap on said heater winding having an index positioned according to the position of said tap; a scale plate with indicia cooperating with said index; said tap being movable between a position adjacent the fixed tap at said end of the heater winding and a position between said fixed tap at the central portion of the heater winding to provide an increase in the anticipatory heating effect; and a resistance element electrically connected in series with the current path through said bimetal element and physically supported by said bimetal element in good heat transfer relationship therewith; said resistance element being mounted between two sheets of flexible insulating material with at least one of said sheets secured to and extending along the bimetal element.

References Cited in the file of this patent

UNITED STATES PATENTS

| | | |
|---|---|---|
| 2,092,327 | Persons | Sept. 7, 1937 |
| 2,343,132 | Barr | Feb. 29, 1944 |
| 2,348,206 | Cunningham et al. | May 9, 1944 |
| 2,687,610 | Malone | Aug. 31, 1954 |
| 2,692,930 | Dillman | Oct. 26, 1954 |

FOREIGN PATENTS

| | | |
|---|---|---|
| 692,018 | Great Britain | May 27, 1953 |
| 740,532 | France | Nov. 14, 1932 |